US007921082B2

(12) United States Patent
Mukker (10) Patent No.: US 7,921,082 B2
(45) Date of Patent: Apr. 5, 2011

(54) FILE RECOVERY UNDER LINUX OPERATING SYSTEM

(75) Inventor: Atul Mukker, Norcross, GA (US)

(73) Assignee: LSI Corporation, Milpitas, CA (US)

( * ) Notice: Subject to any disclaimer, the term of this patent is extended or adjusted under 35 U.S.C. 154(b) by 861 days.

(21) Appl. No.: 10/764,205

(22) Filed: Jan. 23, 2004

(65) Prior Publication Data

US 2005/0165863 A1    Jul. 28, 2005

(51) Int. Cl.
G06F 7/00 (2006.01)
G06F 17/00 (2006.01)

(52) U.S. Cl. ........ 707/674; 707/640; 707/661; 771/161; 771/162

(58) Field of Classification Search ............... 707/1–10, 707/100–104.1, 200–205; 370/352; 345/2.2; 700/108
See application file for complete search history.

(56) References Cited

U.S. PATENT DOCUMENTS

| | | | | |
|---|---|---|---|---|
| 3,653,028 | A * | 3/1972 | Cuccio | 345/2.2 |
| 5,446,884 | A | 8/1995 | Schwendemann et al. | 395/600 |
| 5,594,863 | A | 1/1997 | Stiles | 395/182.13 |
| 5,734,895 | A | 3/1998 | Matsuo | 395/618 |
| 5,761,417 | A * | 6/1998 | Henley et al. | 709/231 |
| 5,778,387 | A * | 7/1998 | Wilkerson et al. | 707/202 |
| 6,018,342 | A * | 1/2000 | Bristor | 715/840 |
| 6,205,558 | B1 * | 3/2001 | Sobel | 714/15 |
| 6,539,392 | B1 * | 3/2003 | Rebane | 707/101 |
| 6,615,224 | B1 * | 9/2003 | Davis | 707/202 |
| 7,051,210 | B2 * | 5/2006 | Scheetz et al. | 713/185 |
| 7,099,947 | B1 * | 8/2006 | Nadeau et al. | 709/229 |
| 7,219,339 | B1 * | 5/2007 | Goyal et al. | 717/143 |
| 7,386,586 | B1 * | 6/2008 | Headley et al. | 709/202 |
| 2002/0194380 | A1 | 12/2002 | Sullivan et al. | 709/246 |
| 2003/0012183 | A1 * | 1/2003 | Butler et al. | 370/352 |
| 2003/0046606 | A1 | 3/2003 | Johnson et al. | 714/25 |
| 2003/0097554 | A1 | 5/2003 | Cheston et al. | 713/2 |
| 2003/0149752 | A1 * | 8/2003 | Baldwin et al. | 709/223 |
| 2003/0172158 | A1 * | 9/2003 | Pillai et al. | 709/225 |
| 2003/0179227 | A1 * | 9/2003 | Ahmad et al. | 345/736 |
| 2003/0212789 | A1 * | 11/2003 | Hamel et al. | 709/225 |
| 2004/0024652 | A1 * | 2/2004 | Buhse et al. | 705/26 |

(Continued)

OTHER PUBLICATIONS

Two Phase File Deletion, IBM Technical Disclosure Bulletin, Apr. 1, 1993, USA, TDB-ACC-No: NN9304373, vol. 36, pp. 373-376.*

(Continued)

*Primary Examiner* — Usmaan Saeed
(74) *Attorney, Agent, or Firm* — Luis M. Ortiz; Kermit D. Lopez; Matthew F. Lambrings (57) ABSTRACT

Methods and systems for recovering data utilize a command line interface of a data-processing system, run by an operating system such as Linux, Unix, DOS, Windows, Mac and the like, to recover and manage inadvertently deleted data. Desired data such as files, folders, and the like can be initially identified from a command line interface. The desired data can then be automatically saved in a memory location of the data-processing system, in response to identifying the desired data from the command line interface. The data can then be automatically recovered from the memory location of the data-processing system for display within the command line interface, if the desired data is inadvertently deleted. Additionally, a user can be permitted to specify a plurality of recycling rules presented through a graphical user interface dialog or other graphical user interface device.

10 Claims, 5 Drawing Sheets

U.S. PATENT DOCUMENTS

| | | | |
|---|---|---|---|
| 2004/0093361 A1* | 5/2004 | Therrien et al. | 707/204 |
| 2004/0163090 A1* | 8/2004 | Ledru et al. | 719/320 |
| 2005/0022213 A1* | 1/2005 | Yamagami | 719/328 |
| 2005/0033777 A1* | 2/2005 | Moraes et al. | 707/202 |
| 2005/0075748 A1* | 4/2005 | Gartland et al. | 700/108 |
| 2005/0076264 A1* | 4/2005 | Rowan et al. | 714/6 |
| 2005/0120242 A1* | 6/2005 | Mayer et al. | 713/201 |

OTHER PUBLICATIONS

Ian Smith, "Using the TSM Client Command Line Interface for Backup and Restore," Apr. 2002, University of Oxford, pp. 1-2.*

"What is Linux", Linux Online!, http:/www.linux.org/info/index/html, pp. 1-2, 1994.

* cited by examiner

FIG. 1

```
Terminal
File  Edit  View  Terminal  Go  Help
bash 0 2.05b$ pwd
/home/atul/noratullinux/temp               ← 210
bash-2.05b$ ls -l
total 12
-rw-r--r--    1 atul    users      10832 Oct 21 16:00 review.doc   ← 212
bash-2.05b$ rm review.doc    ← 214
bash-2.05b$ ls -la
total 28
drwxr-xr-x    2 atul   users     12288 Oct 21 14:43 -
drwxr-xr-x   56 atul   users     16348 Oct 21 14:40 -
+--------------+----------------------+------------------+------+
| File - Name  | Original Location    | Deleted - On -   | Size |
+--------------+----------------------+------------------+------+
.weblink        /home/atul/            Oct 21 2003 16: 2:39  168B
review.doc      /home/atul/noratullinux/temp    Oct 21 2003 16: 2:55  10K
bash-2.05b$ rm -- savage review.doc    ← 216
File Name    : review.doc                                         ← 218
File Size    : 10832
Deletion Time : Oct 21 2003  16: 2:55
Deleted From  : /home/atul/noratullinux/temp
Restored at   : /home/atul/noratullinux/temp
[S]kip/[M]ove[Q]uit: m
bash-2.05b$ ls -l
total 12
-rw-r--r--    1 atul users    10832 Oct 21 16:02 review.doc    ← 220
bash-2.05b$
```

FILE RECOVERY UNDER LINUX OPERATING SYSTEM

TECHNICAL FIELD

Embodiments are related to file recovery systems. Embodiments are also related to computer operating systems. Embodiments are additionally related to command line interface applications. Embodiments are also related to graphical user interface applications.

BACKGROUND OF THE INVENTION

An operating system (OS) is the master control program that runs a data-processing system or computer. The operating system sets the standards for all application programs that run in the computer, and is typically implemented as the software that controls the allocation and usage of hardware resources of the data-processing system. Examples of operating systems include Windows, Mac, OS, UNIX, DOS, and Linux.

Linux has in recent years become a popular operating system for managing the operations of computers. Linux is popular because it may be obtained with little or no license fee. In addition, Linux is an open source operating system, allowing a programmer to easily configure it for the limited processing capabilities and memory space of many data-processing systems, such as computers, workstations, and even portable and laptop computers. Linux is thus an alternative to commonly-utilized operating systems, such as Windows, Mac, OS, UNIX, DOS and the like.

The most important asset of any data-processing system (e.g., a computer) is the data stored within the system itself. Such information or data is often stored in folders and files. If a user accidentally removes the fields from the command line, a definite technique or device does not exist for reliably recovering the deleted data. This process is different for the file removed utilizing graphical user interfaces such as, for example, a file explorer or other similar device. Files removed utilizing such file explorer devices, for example, can be recovered utilizing operation system built-in mechanisms. Such is not the case, however, when utilizing a command line interface provided by most operating systems. A solution is therefore needed, which permits users to recover data utilizing the command line interface.

BRIEF SUMMARY

The following summary of the invention is provided to facilitate an understanding of some of the innovative features unique to the present invention and is not intended to be a full description. A full appreciation of the various aspects of the invention can be gained by taking the entire specification, claims, drawings and abstract as a whole.

It is therefore one aspect of the present invention to provide improved data-processing methods and systems.

It is another aspect of the present invention to provide improved methods and systems for recovering deleted data.

It is yet another aspect of the present invention to provide methods and systems for recovering deleted data utilizing a command line interface.

It is a further aspect of the present invention to provide for a graphical user interface application for implementing user specified rules for the recycling of data.

The above and other aspects of the invention can be achieved as will now be briefly described. Methods and systems for recovering data are disclosed herein. Desired data such as files, folders, and the like can be initially identified from a command line interface displayable within a dispiay area of a data-processing system (e.g., a computer). The desired data can then be automatically saved in a memory location of the data-processing system, in response to identifying the desired data from the command line interface. The data can then be automatically recovered from the memory location of the data-processing system for display within the command line interface, if the desired data is inadvertently deleted. The operating system itself can be implemented from one of a variety of operating systems, such as, for example, Linux, Unix, DOS, Windows, Mac and the like. Additionally, a user can be permitted to specify a plurality of rules for recycling the data. Such rules can be presented to the use through a graphical user interface dialog or other graphical user interface devices.

BRIEF DESCRIPTION OF THE DRAWINGS

The accompanying figures, in which like reference numerals refer to identical or functionally-similar elements throughout the separate views and which are incorporated in and form part of the specification further illustrate embodiments of the present invention.

DETAILED DESCRIPTION OF THE INVENTION

The particular values and configurations discussed in these non-limiting examples can be varied and are cited merely to illustrate embodiments of the present invention and are not intended to limit the scope of the invention.

The present invention is presented in the context of a preferred embodiment. The preferred embodiment of the present invention is a method and system for recovering and recycling data utilizing a command line interface. Through the use of the present invention, a user is permitted to recover and manage inadvertently deleted data trough a command line application.

Figure 1:
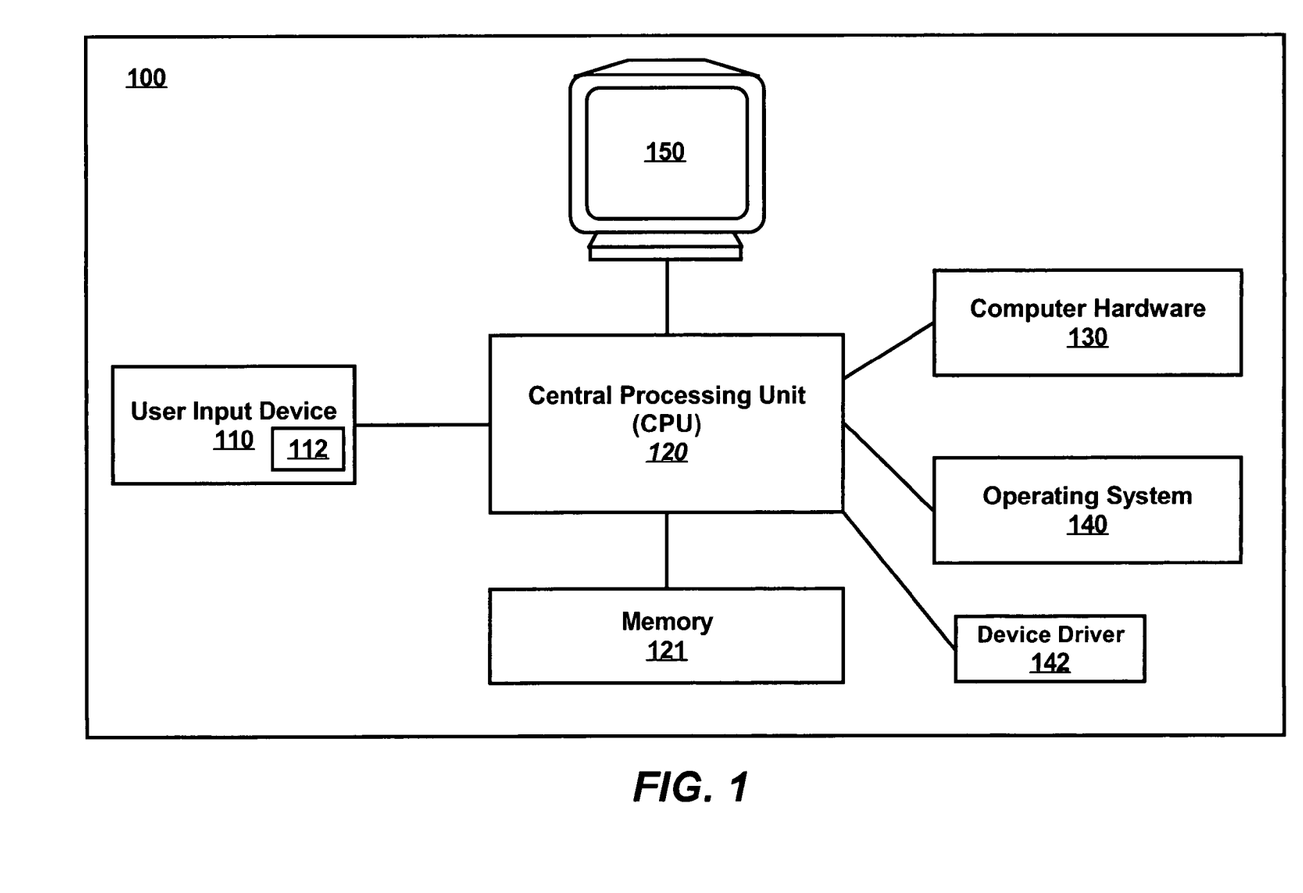
FIG. 1 illustrates a block diagram of a system in which a preferred embodiment of the present invention can be implemented.

For a further understanding of the present invention, reference is made to FIG. 1, which depicts a data-processing system 100 in which an embodiment of the present invention can be implemented. Data-process system 100 of FIG. 1 generally includes a user input device 110, a central processing unit 120, computer hardware 130, a monitor 150, and an operating system 140. The user input device 110 can be coupled to the central processing unit 120 wherein the central processing unit 120 is coupled to the computer hardware 130 and the operating system 140. User input device 110 can be implemented, for example, as a computer keyboard, a computer mouse, and so forth.

The central processing unit 120 refers to the processor, the memory (RAM) and the I/O architecture (channels or buses). A memory 121 is coupled to the central processing unit 120. The operating system 140 is the master control program that runs the computer. It sets the standards for all application programs that run in the computer. Operating system 140 can be implemented as the software that controls the allocation and usage of hardware resources, such as memory 121, central processing unit 120, disk space, and other peripheral devices, such as monitor 150, user input device 110 and computer hardware 130. Examples of operating systems, which may be utilized to implement operating system 140 of system 100 include Windows, Mac, OS, UNIX and Linux. For illustrative purposes only, it can be assumed that operating system 140 can be implemented as a Linux operating system, which is described in greater detail herein.

The user input device 110 can includes a plurality of device descriptor files 112. The device descriptor files 112 contain information related to the user input device, e.g. what type of device it is, who made the device, etc. The device descriptor files 112 can also contain user defined fields called report descriptors. Report descriptors are strings of information that the operating system 140 can read. Report descriptors can be implemented, for example, as for passing useful information about the user input device 1110 to the operating system 140 and/or a device driver 142. Such report descriptors are unique for each type of user input device.

Figure 2:
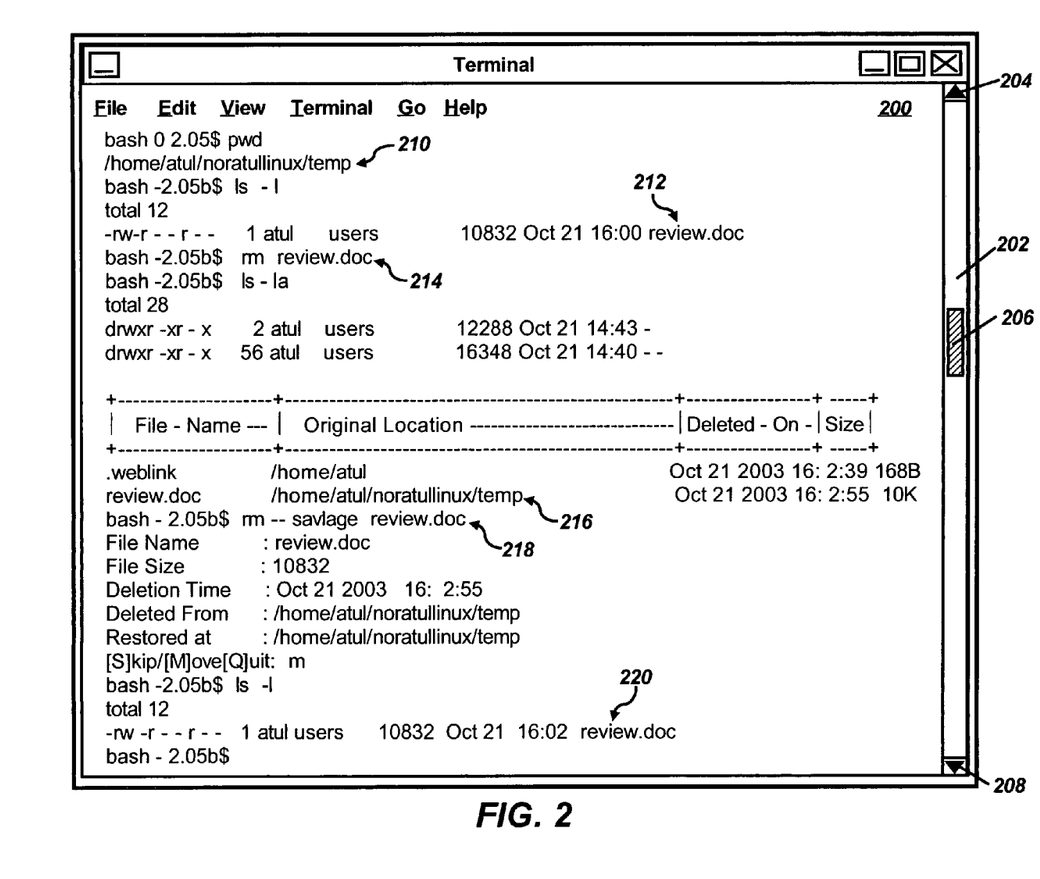
FIG. 2 illustrates a pictorial diagram of a command line interface displayed within a graphical user interface, in accordance with a preferred embodiment of the present invention.

FIG. 2 illustrates a pictorial diagram of a graphical user interface window 200 in which an embodiment of the present invention can be implemented. Window 200 is an example of a graphical user interface device in which a portion of the screen contains its own document or message. Window 200 can be divided in one or more other windows, each of which contain its own boundaries and can contain varying documents and displayable data. Thus, window 200 can be implemented in the context of a windowing environment for display on a display screen of a monitors, such as, for example, monitor 150 depicted in FIG. 2.

Window 200 in FIG. 2 displays an example of a user interaction session, which can be implemented in accordance an embodiment of the present invention. Although window 200 functions as a graphical user interface, due to the presence, for example, of graphical user interface devices such as scroll bar 202, window 200 can display a command line interface, which in and of itself represents a different type of user interface. A command line interface can be displayed within a graphical user interface device such as window 200 or external to such a graphical user interface device.

In general, a command line interface is a user interface to a computer's operating system or an application in which the user responds to a visual prompt by typing in a command on a specified line, receives a response back from the system, and then enters another command, and so forth. The MS-DOS Prompt application, for example, in a Windows operating system is an example of the provision of a command line interface. Today, most users prefer the graphical user interface (GUI) offered by Windows, Mac OS, BeOS, and others. Typically, most of today's Linux-based and UNIX-based systems offer both a command line interface and a graphical user interface. In the example illustrated in FIG. 2, a command line interface is displayed within window 200, which permits a user to interact with operation system 140 of FIG. 1.

Window 200 generally includes a scroll bar 202 along with respective up arrow and down arrow keys 204 and 208. Scroll bar 202 comprises a vertical scroll bar located at the right hand side of window 200, which can be utilized by a user in association with a user input device such as a keyboard, mouse or other graphical pointing device for moving about in the area encompassed by window 200. A sliding scroll bar 206 can be located within scroll bar 202, which when activated by a user, permits movement to an arbitrary location within the display area encompassed by window 200.

The most important asset on any computer or data-processing system is the information stored within the computer. The information or data is often stored in the form of folders and/or files. If a user accidentally removes the data from a command line, there is no definitive method to reliably recover the deleted data. It is important to note that this process differs for the file or folder removed using a graphical user interface, such as, a file explorer. Files removed utilizing a file explorer-type interface can be recovered through OS built-in mechanisms. The Embodiments described herein, however, permit a user to recover a file or a folder reliably even though it was removed using a command line interface such as that depicted in window 200. A command line interface can be provided by most operating systems, such as, for example, UNIX and Linux. Interfaces have not existed to date, however, which permit users to recover files removed utilizing a command line interface. Embodiments disclosed herein solve this problem.

Thus, displayed within the command line interface shown in window 200 is an original file location 210. The original file 212 associated with the original file location 210 is also depicted within the command line interface of window 200. Line 214 indicates that the file was accidentally or inadvertently removed. The "deleted" file, however, is automatically saved, as indicated at line 216, and thereafter, as indicated at line 218, the deleted file is shown to have been recovered. Finally, the recovered file name is displayed, as indicated at line 220. Window 200 thus displays a functionality made available to computer users, which permits such users to recover files deleted from the command line.

The embodiment of FIG. 2 can be implemented in the context of a computer program that replaces existing file removal tools provided by the operating system (e.g., Linux, UNIX, Windows, and the like). Once the users have installed this computer program on their computer or data-processing system (e.g., system 100), the users can take advantage of the command line tools to remove files and folders and other data without fear of permanently losing such information. An accidental removal of data can thus be easily reverted because of the capability provided by such a tool.

Figure 3:
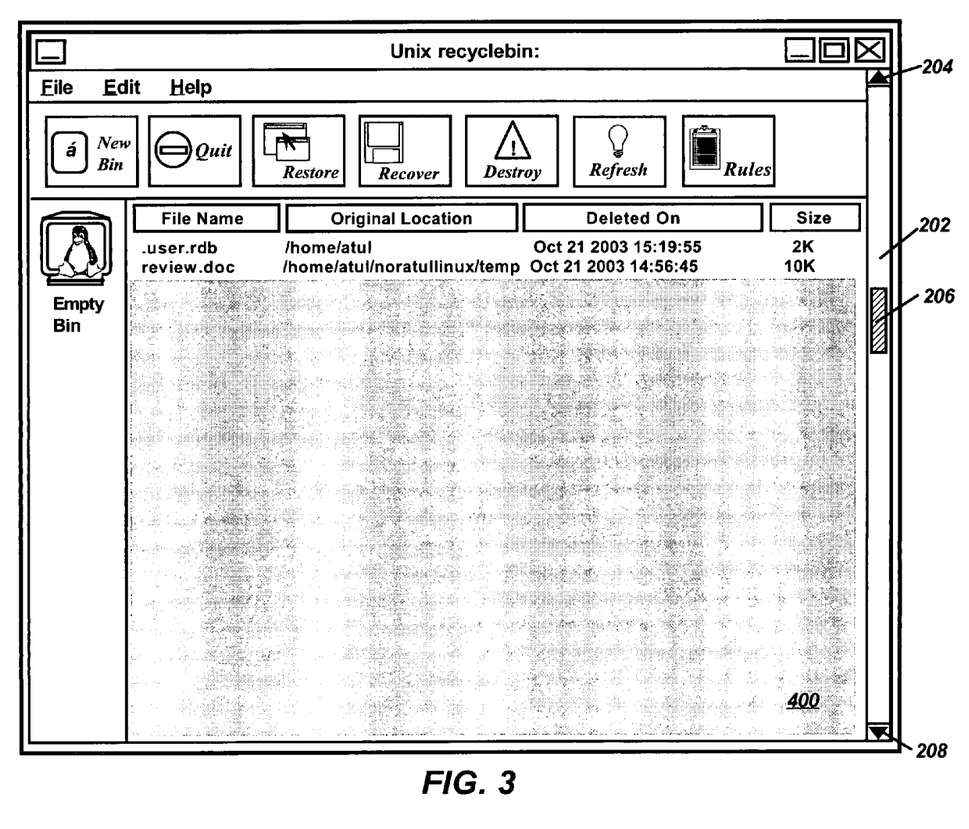
FIG. 3 illustrates a pictorial diagram of a graphical user interface application, which can be implemented, in accordance with a preferred embodiment of the present invention.

FIG. 3 illustrates a pictorial diagram of a graphical user interface application, which can be implemented, in accordance with a preferred embodiment of the present invention. A graphical user interface window 300 depicted in FIG. 3 is analogous to window 200 of FIG. 2. Assuming the activity of window 200 of FIG. 2 is complete, the user removes a file from the command line. The user can then be presented with an option to view all previously deleted files and recover the deleted files.

Window 300 therefore depicts an example of a graphical user interface application, which can be implemented to allow a user to view and recover previously deleted files. An example of one such interaction is depicted in FIG. 3. Note that in FIGS. 2 and 3, identical or similar parts or elements are generally indicated by identical reference numerals. Thus, for example, window 300 also includes a scroll bar 202 along with respective up arrow and down arrow keys 204, 208, and so forth.

Figure 4:
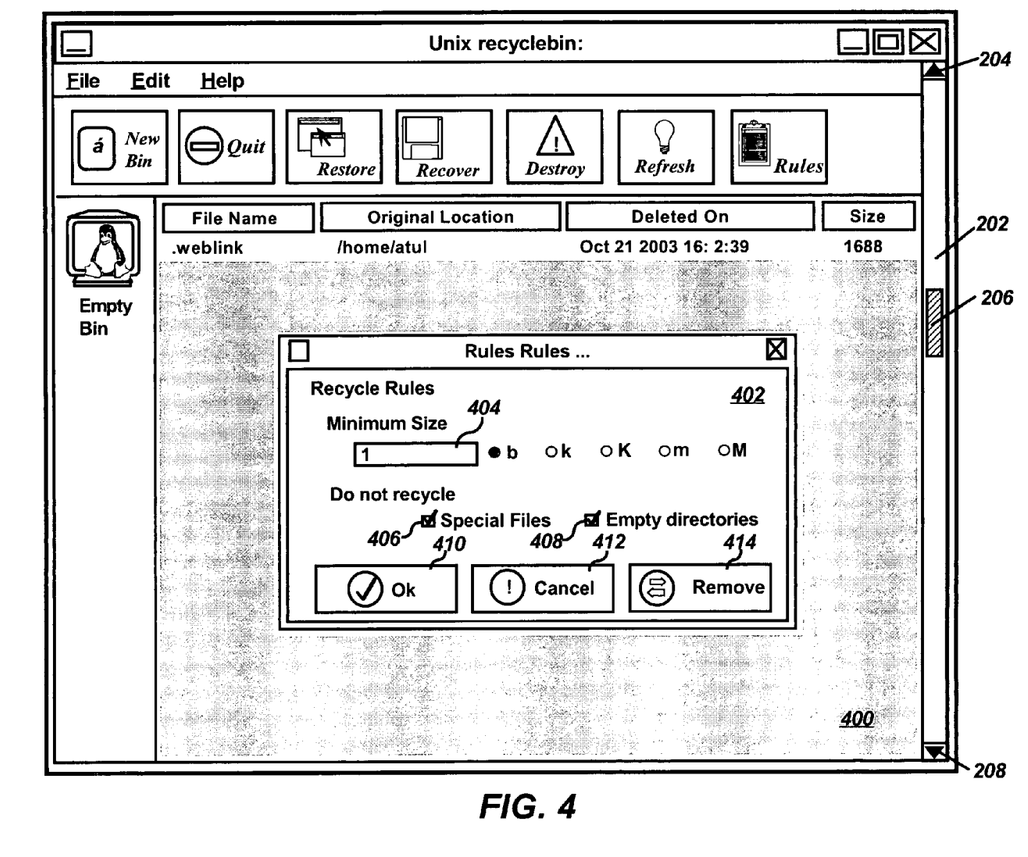
FIG. 4 illustrates a pictorial diagram of a graphical user interface application, which can be implemented, in accordance with an alternative embodiment of the present invention.

FIG. 4 illustrates a pictorial diagram of a graphical user interface application, which can be implemented, in accordance with an alternative embodiment of the present invention. A window 400 is depicted in FIG. 4, which is analogous to window 300 of FIG. 3. Note that in FIGS. 3 and 4, identical or similar parts or elements are generally indicated by identical reference numerals. In the alternative embodiment depicted in FIG. 4, rules can be specified by the user for recycling files.

Cases may exist in which is man not be necessary or make sense to recycle certain types of files and/or other data. For example, a file with no data can be such a candidate. Folders that do not possess subfolders or files may also be such a candidate. Special files such as device nodes, links to other files, and so forth, which do not contain useful information themselves may also be candidates for recycling. If a user does not wish to recover such files, the user can specify so utilizing recycle rules. Window 400 of FIG. 4 presents an example of a user interaction dialog 402, which can be presented to a user within window 400 for implementing such a process.

In the example depicted in FIG. 4, a user has set the minimum size of the file to be at least 1 byte before the file can be recycled, as depicted at field 404 of dialog 402. The user also specifies, as depicted in FIG. 4, that the empty folder and special files should not be recycled, as indicated by the checkmarks activated at buttons 406 and 408. Utilizing the same dialog 402, the user can optionally turn off the rules by remove the "Remove" rules option, indicated by button 414. Note that button 412, when activated by a user, permits the specified values or settings indicated by dialog 402 to be implemented, while button 412, labeled "Cancel," simply cancels the dialog options of dialog 402.

Window 400 therefore depicts a graphical user interface application or tool, which permits a user to be able to reliably cover files or other data deleted from the command line and also permit the user to specify rules associated with the recycling of such files or data. An advantage or such an application or tool is the data recovery and availability thereof in case of the accidental removal of files, folders or other data.

Figure 5:
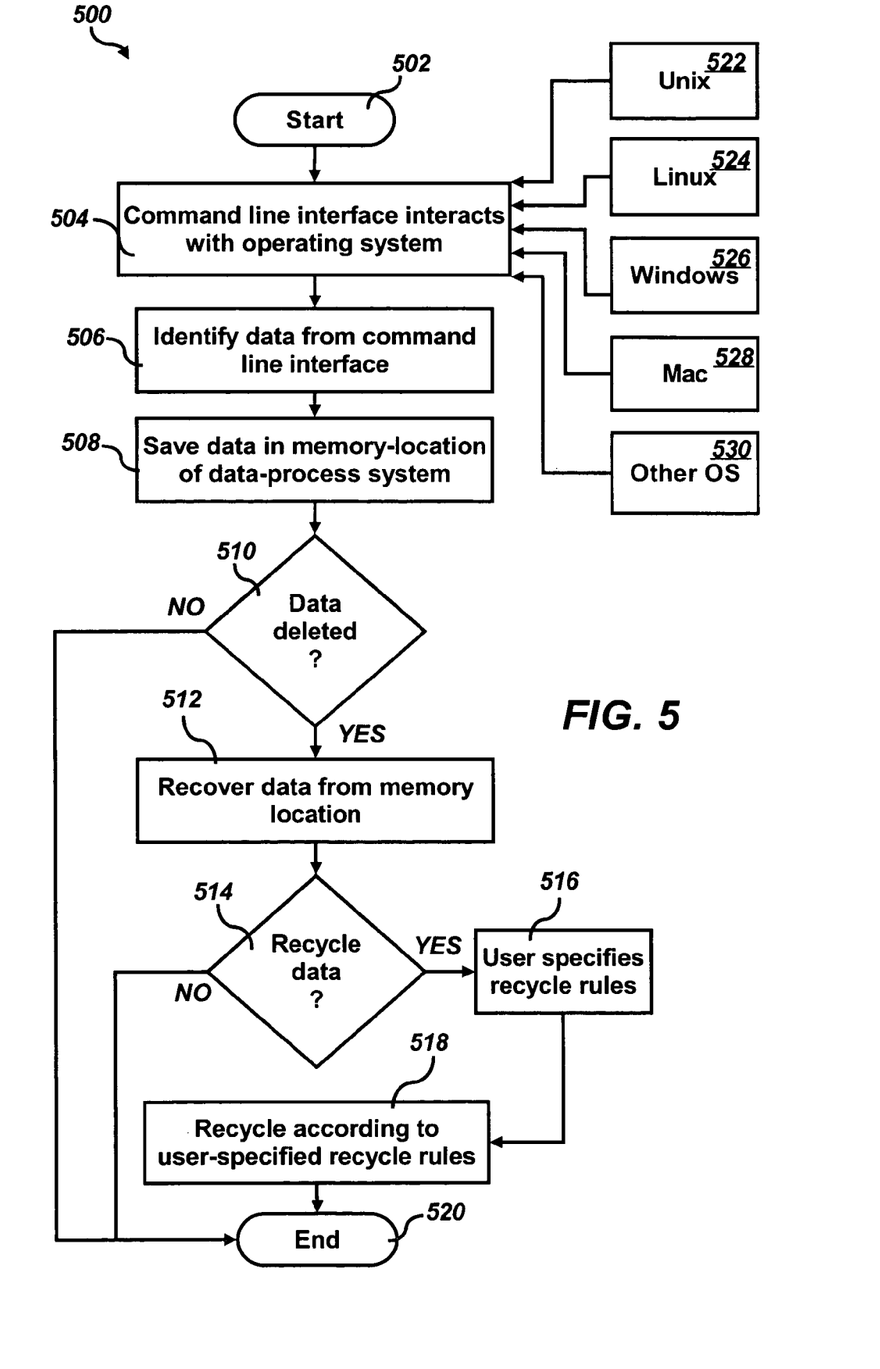
FIG. 5 illustrates a flow chart of operations depicting logical operational steps, which may be implemented in accordance with an alternative embodiment of the present invention.

FIG. 5 illustrates a flow chart 500 of operations depicting logical operational steps, which may be implemented in accordance with an alternative embodiment of the present invention. The process can be initiated, as depicted at block 502. Thereafter, as indicated at block 504, a command line interface, such as that depicted in FIG. 2, can interact with an operating system, such as operating system 140 of FIG. 1. Examples of operating systems that can be implemented in accordance with the methodology of FIG. 5 include Unix 522, Linux 524, Windows 526, Mac 538, or other operating systems 530. Note that one or more such operating systems can be implemented in the context of the computer or data-processing system 100 of FIG. 1.

As depicted thereafter at block 506, desired data (e.g., files, folders, etc.) can be identified from the command line interface, which may be displayed within a display area (e.g., monitor 150) of the data-processing system (e.g., system 100). Next, as illustrated at block 508, the desired data can be automatically saved in a memory location (e.g., memory 121) of the data-processing system, in response to identifying the desired data from the command line interface. Thereafter, as indicated at block 510, a test can be performed to determine if the data was deleted.

If the data was not deleted, then the process simply terminates, as indicated by block 520. If, however, it is determined that the data was deleted, then as indicated at block 512, the data can be automatically recovered from the memory location of the data-processing system for display within the command line interface, if the desired data was inadvertently deleted. The data itself can be automatically displayed within the command line interface, in response to automatically recovering the data from the memory location of the data-processing system.

Following processing of the operation depicted at block 514, a test can be performed to determine if the user wishes to recycle data. If not, then the process terminates, as indicated at block 520. If so, then user specified rules can be set, as indicated at block 516, through a dialog, such as dialog 402 of FIG. 4. Recycling then takes place according to the user specified rules, as indicated at block 518. The process then terminates, as indicated at block 520.

Note that embodiments of the present invention can be implemented in the context of modules. In the computer programming arts, a module can be typically implemented as a collection of routines and data structures that performs particular tasks or implements a particular abstract data type. Modules generally are composed of two parts. First, a software module may list the constants, data types, variable, routines and the like that that can be accessed by other modules or routines. Second, a software module can be configured as an implementation, which can be private (i.e., accessible perhaps only to the module), and that contains the source code that actually implements the routines or subroutines upon which the module is based.

The term module, as utilized herein can refer to software modules or implementations thereof. Such modules can be utilized separately or together to form a program product that can be implemented through signal-bearing media, including transmission media and recordable media. The operations illustrated at blocks 502 to 530 of FIG. 5 can, for example, be implemented in the context of one or more modules. The operation depicted at block 506, for example, can be implemented as a module for identifying desired data from a command line interface displayable within a display area of a data-processing system, while the operation illustrated at block 508 can be implemented as a module for automatically saving the desired data in a memory location of the data-processing system, in response to identifying the desired data from the command line interface. The operations depicted at blocks 510 and 512 can be implemented as a module for automatically recovering the data from the memory location of the data-processing system for display within the command line interface, if the desired data is inadvertently deleted, and so on.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

The invention claimed is:

1. A method in a data-processing system for recovering data, said data-processing system having a central processing unit coupled to an operating system, memory coupled to said central processing unit, and a command line interface to said operating system in which a user responds to a visual prompt by typing in a command on a specified line and receives a response back from the data-processing system; the method comprising:
   utilizing said command line interface to interact with said operating system;
   identifying desired data from said command line interface displayable within a display area of said data-processing system;
   automatically saving said desired data in said memory of said data-processing system, in response to identifying said desired data from said command line interface;
   testing using said data-processing system to determine if said desired data has been deleted from a command line of said command line interface;
   automatically recovering deleted desired data from said memory of said data-processing system for display within said command line interface in automatic response by said data-processing system to said desired data being deleted from said command line of said command line interface;
   automatically displaying said deleted desired data within said command line interface, in response to automatically recovering said deleted desired data from said memory;
   permitting the user to specify a plurality of rules for recycling said deleted desired data that the user does not wish to recover;
   prompting said user to specify said plurality of rules for recycling said deleted desired data through a display of a graphical user interface dialog;
   specifying the minimum size of said data to be recycled and/or specifying special files/empty directories not to be recycled, and
   recycling said deleted desired data according to said rules.

2. The method of claim 1 further comprising
   displaying an original file of said desired data within said command line interface;
   displaying an original file location of said desired data within said command line interface;
   indicating within said command line interface deletion of said desired data in response to said desired data being deleted using said command line interface; and
   automatically recycling said file when said file does not contain useful information.

3. The method of claim 2 further comprising
   displaying with the same window of said command line interface said original file, said original file location, said indication of deletion of said desired data, and said recovered data.

4. The method of claim 3 wherein said operating system comprises a Linux-based operating system.

5. The method of claim 3 wherein said operating system comprises a Unix-based operating system.

6. The method of claim 1 wherein said operating system comprises a Windows-based operating system.

7. A data-processing system for recovering data, comprising:
   a central processing unit coupled to an operating system;
   memory coupled to said central processing unit; and
   a command line interface to said operating system in which a user responds to a visual prompt by typing in a command on a specified line and receives a response back from the data-processing system;
   said central processing unit being configured to:
   utilize said command line interface to interact with said operating system;
   identify desired data from said command line interface displayable within a display area of said data-processing system;
   automatically save said desired data in said memory, in response to identifying said desired data from said command line interface;
   test to determine if said desired data has been deleted from a command line of said command line interface;
   automatically recover deleted desired data from said memory for display within said command line interface in automatic response by said central processing unit to said desired data being deleted from said command line of said command line interface;
   automatically display said deleted desired data within said command line interface, in response to automatically recovering said deleted desired data from said memory;
   wherein said central processing unit is configured to
   permit the user to specify a plurality of rules for recycling said deleted desired data that the user does not wish to recover;
   a graphical user interface, coupled to said central processing unit, configured to prompt said user via a dialog to specify said plurality of rules for recycling said data;
   specify the minimum size of said data to be recycled and/or specify special files/empty directories not to be recycled; and
   recycle said desired deleted data according to said rules.

8. The system of claim 7 wherein said central processing unit is further configured to
   display an original file of said desired data within said command line interface;
   display an original file location of said desired data within said command line interface;
   indicate within said command line interface deletion of said desired data in response to said desired data being inadvertently deleted using said command line interface; and
   automatically recycle said file when said file does not contain useful information.

9. The system of claim 8 wherein said central processing unit is further configured to
   display with the same window of said command line interface said original file, said original file location, said indication said deletion of desired data, and said recovered data.

10. The system of claim 9 wherein said operating system comprises a Linux-based operating system, a UNIX-based operating system or a Windows-based operating system.

* * * * *